United States Patent [19]

Oiry et al.

[11] Patent Number: 5,141,097
[45] Date of Patent: Aug. 25, 1992

[54] CONTROL DEVICE FOR A FLOW OF OBJECTS IN CONTINUOUS FILE

[75] Inventors: Herve Oiry; Hervé Nicotra, both of Nantes; Dominique Barba, Carquefou; Christian Viard-Gaudin, Nantes, all of France

[73] Assignee: La Poste, Paris, France

[21] Appl. No.: 754,023

[22] Filed: Sep. 3, 1991

[30] Foreign Application Priority Data

Sep. 4, 1990 [FR] France ................... 90 10967

[51] Int. Cl.⁵ .................................. B65G 47/31
[52] U.S. Cl. .............................. 198/460; 198/444
[58] Field of Search ............. 198/460, 461, 443, 444, 198/396, 572

[56] References Cited

U.S. PATENT DOCUMENTS

| | | | |
|---|---|---|---|
| 3,155,221 | 11/1964 | Griner | 198/461 X |
| 3,822,009 | 7/1974 | Richards | 198/444 |
| 4,024,381 | 5/1977 | Fluck | 198/444 X |
| 4,190,146 | 2/1980 | Knuchel | 198/461 X |
| 4,634,328 | 1/1987 | Carrell | 198/444 X |
| 4,653,630 | 3/1987 | Bravin | 198/460 |
| 4,690,269 | 9/1987 | Takao | 198/460 |
| 4,984,678 | 1/1991 | Fauchard | 198/443 |
| 4,986,410 | 1/1991 | Shields | 198/444 |

FOREIGN PATENT DOCUMENTS

| | | |
|---|---|---|
| 0310411 | 4/1989 | European Pat. Off. . |
| 0366857 | 5/1990 | European Pat. Off. . |
| 0383673 | 8/1990 | European Pat. Off. . |
| 3544093 | 6/1987 | Fed. Rep. of Germany ...... 198/460 |
| 0070291 | 6/1977 | Japan ................... 198/460 |

Primary Examiner—Robert P. Olszewski
Assistant Examiner—James R. Bidwell
Attorney, Agent, or Firm—Pollock, VandeSande & Priddy

[57] ABSTRACT

Control device for a flow of objects in continuous file and, more particularly, of postal parcels or packages, prior to their introduction into a separator mechanism which imposes at its oulet a suitable spacing between one object and the next, which comprises a first conveyor belt on which the objects are disposed in bulk, this conveyor travelling at a variable linear speed (V1), a second conveyor belt, disposed following the first and driven at a similarly variable linear speed (V2), a photographic camera for the acquisition in real time of an image of the second conveyor and of the packages transported by it, presenting according to the length of the conveyor a given longitudinal dimension (L), a processing circuit for the image received from the camera in order to discern within this image the number of packages (Nc) which it contains, a computer for controlling the instantaneous speeds (V1 and V2) of the two conveyors during the transfer of the packages disposed on the second conveyor according to the dimension (L), this speed (V2) being chosen such that the throughput of the packages delivered by the second conveyor to the entrance of the separator mechanism is constantly equal to a predetermined target value (D), and an incremental coder for triggering the acquisitions of images by the camea.

7 Claims, 1 Drawing Sheet

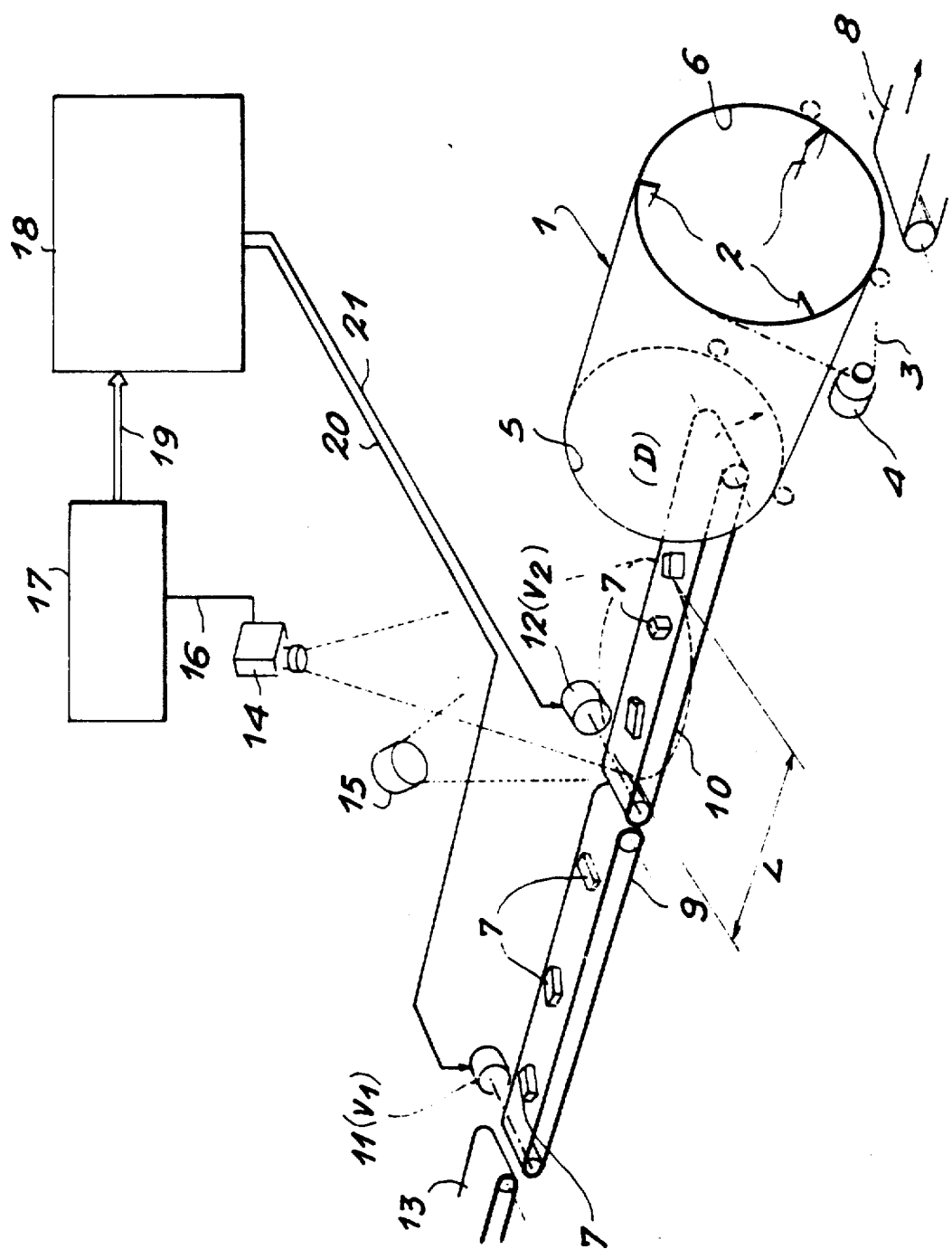

CONTROL DEVICE FOR A FLOW OF OBJECTS IN CONTINUOUS FILE

The present invention relates to a control device for a flow of objects in continuous file and applies more particularly, though not exclusively, to the control of the throughput of a collection of parcels, postal packages or other similar objects, of generally convex volume, disposed on a moving table or conveyor belt prior to processing of these objects, notably for the purposes of indexing them, franking them and sorting them according to their destinations.

One can conceive the necessity of controlling the throughput or the flow of objects of this kind, delivered in bulk onto a conveyor belt, in order notably to determine certain parameters such as their number, their relative positioning, their distance of separation between one package and the next etc..., before these objects are individually subjected to a specific operation within a suitable sorting installation. Indeed, if these parameters are not met, in particular if the packages delivered are too close together, or even overlapping, then it is clear that the installation will fail to operate optimally.

Within the postal field more particularly, there is a tendency to use chains or mechanisms of conveyance and of automatic processing of postal parcels, in order to present them suitably to a franking bay and then a sorting bay, according to the destinations of these parcels. To this end, from the point at which a device unloads the packages in bulk onto a conveyor belt, these are subjected to appropriate individual spacing such that the separation distance imposed upon them enables the desired indexation and sorting operations to be carried out on each of them, without risk of confusion between one package and the next and without risk of error in their processing.

For this purpose, there has already been proposed, in French Patent Application No. 89.01981 of Feb. 15, 1989, a separator mechanism which realises a satisfactory separation of parcels received in bulk and delivered in file with a correct spacing. This device comprises notably a truncated-cone shaped drum with its axis inclined towards the vertical and rotatably mounted about this axis, this drum containing in its inner wall a set of helical fins suitably shaped and orientated, such that by adjusting the inclination of the drum and its rotation speed, the packages, received through its open upper part, are carried along by the drum fins in combination with the effect of gravity, giving rise to their successive inversions and, at the same time, their mutual spacing up to the lower extremity of the drum, whence they are discharged to be taken up by a conveyor belt or other equivalent means of conveyance dispatching them towards the indexation, franking and final sorting installations, according to the locality of the addresses shown on the parcels.

Now, the optimal working of the device thus envisaged requires however that the packages introduced in bulk to the open upper part of the drum should not present themselves in totally erratic fashion and, in particular, in too large a quantity within a short space of time but calls, on the contrary, for a regulation of the flow or throughput of these packages prior to their tipping into the interior of the separator drum.

The present invention relates to a control device for a flow of objects, more particularly of packages of the postal parcel type, in continuous file, which meets this objective by enabling the throughputs of the objects to be controlled in real time according to the parameters of regulation of this throughput which depend equally upon the shape and dimensions of these packages.

To this end, the envisaged device, for the regulation of the throughput of objects in continuous file prior to their introduction into a separator mechanism which imposes at its outlet a suitable spacing between one object and the next, is characterised in that it comprises a first conveyor belt on which the objects are disposed in bulk, this conveyor travelling at a variable linear speed V1, a second conveyor belt disposed following the first and driven at a similarly variable linear speed V2, a photographic camera for the acquisition in real time of an image of the second conveyor and of the packages transported by it, presenting according to the length of the conveyor a given dimension L, a processing circuit for the image received from the camera in order to discern within this image the number of objects which it contains, a computer for controlling the instantaneous speeds V1 and V2 of the two conveyors during the transfer of the packages disposed on the second according to the dimension L, the speed V2 being chosen such that the throughput of the packages delivered by the second conveyor to the entrance of the separator mechanism is constantly equal to a predetermined target value D, and an incremental coder provided at the extremity of the second conveyor for triggering the successive acquisitions of images by the camera.

The invention aims therefore, with each sequence of photographs corresponding to the passage of packages with the second conveyor over a distance equal to the dimension L, at the speed V2, to control the speeds V1 and V2 of the conveyors, such that the following formulae are satisfied:

$$V1 = K \cdot V2 \text{ where } K \leq 1 \quad (1)$$

$$V2 \frac{L \cdot D}{Nc} \quad (2)$$

Nc being the number of parcels distributed on the second conveyor in the photograph corresponding to the dimension L on this conveyor and D being the target throughput to be met.

In a preferred embodiment of the invention, the device contains a so-called CCD camera, of the charge-transfer, solid-component matrix type, connected to an infra-red filter, the camera being set up for the acquisition of an image of the first conveyor belt, the transverse dimension of which is equal to L. Advantageously, the camera is also connected to a suitable lighting aggregate.

According to another specific characteristic, the two conveyor belts are separately driven by two geared motors having a speed variator, in order to vary the speed, in accordance with the invention, according to the characteristics of the image supplied by the camera, analysed by the processing circuit and actuating a computer transmitting command orders to these geared motors.

Also prefentially, the image-processing circuit for the image captured by the camera comprises an electronic assembly suitable for digitalising this image and for extracting from its contour, in real time, an estimate of the number of packages which it contains, by reconstituting the silhouettes belonging to each package and counting them.

More particularly, the digital processing circuit is provided such that, from the silhouette of the packages which has been extracted from the image supplied by the camera, it analyses the convexity of the contour of this silhouette in order to determine the number of packages contained in the length L and to direct to the geared motors controlling the two successive conveyors, by way of the computer, command signals enabling their speeds to be adjusted in order that the throughput D of the packages at the entrance to the separator mechanism is constantly equal or virtually equal to the fixed target throughput.

It has been shown in fact that postal parcels exhibit, as a most general rule, a mass of cylindrical or more often still parallelepipedal shape, these common convex shapes representing more than 96% of the volume processed in an ordinary sorting installation. It has also been found that the projection onto any plane whatsoever of an object of convex shape will necessarily give rise to a silhouette which is itself convex. From there, it is conceivable that, at least in terms of a first approximation, the analysis of the image supplied by the camera will be able to provide an indication of the number of packages present in this image and enable the conveyor speeds to be controlled in order to obtain the regulation of the desired throughput.

Other characteristics of a control device for a flow of objects in continuous file and, more particularly, packages or postal parcels within a sorting installation for such packages, will yet become apparent from the following description of an embodiment example provided on an indicative and non-limiting basis, reference being made to the attached drawing on which the only FIGURE represents a perspective view of this device.

On this FIGURE, reference 1 designates a separator drum, notably of the type of that described and represented in the previously cited patent application 89.01981, this drum of general truncated-cone shape containing internally a series of imbricated helical fins 2. The drum 1 is driven in rotation about its axis (not representated), itself disposed so as to be inclined towards the vertical, by means of a chain or a belt 3, controlled by a drive motor 4. The drum 1 is open at its two extremities, 5 and 6 respectively, the smaller-diameter extremity 5 being designed to receive parcels or packages 7 tipped into the interior of the drum such that, by virtue of the rotation of the latter and of the inclination of its axis, these packages are subjected, under the effect of the fins 2 and gravity, to successive inversions in the course of their journey, the result of which is, at the outlet, to produce in principle an appropriate spacing from one to the next. A the larger-diameter extremity 6 of the drum 1, the packages 7 are then taken up by a conveyor belt 8, dispatching them towards the other bays of a sorting installation, the design details of which are of little importance to the present invention and are therefore not described here.

In order to obtain under all circumstances, at the outlet of the separator drum, a suitable spacing of the packages, it turns out however to be necessary that the throughput of these packages at the entrance 5 into which these packages are tipped in bulk should always be less than a predetermined target value D, the device according to the invention enabling such a regulation of this throughput to be precisely guaranteed.

To this end, the envisaged device consists of two conveyor belts, 9 and 10 respectively, each driven at a given speed by a geared motor equipped with a speed variator, designated throughout by 11 for conveyor 9 and by 12 for conveyor 10. These two conveyors are situated in the same plane and in mutual extension of each other, such that the packages 7, tipped in bulk onto the first conveyor 9 from a feed belt 13 or from another equivalent mechanism disposed upstream, are able to pass automatically from conveyor 9 to conveyor 10 at the spot where these lie adjacent.

The device contains moreover a photographic camera 14, mounted above the second conveyor 10, perpendicular to this, so as to obtain a photograph in real time corresponding to the image of the packages 7 present according to a dimension of this conveyor determined by a distance L given as a function, notably, of the angle of aperture of the lens of the camera 14. This is preferentially a .a so-called CCD camera, with a solid-component matrix, of the charge transfer type, advantageously connected to an infra-red filter (not represented). A light spot 15 is preferentially also disposed alongside the camera, so as to illuminate suitably that part of the conveyor filmed by the camera.

The image thus acquired by the camera 14 is then transmitted, through a link 16, to a digital processing circuit 17, which enables the silhouette, generally convex, of the successive packages to be extracted from the image and enables the number of these packages present at a given moment, according to the length L taken as a reference, to be calculated therefrom. Following on from the circuit 17 is provided a computer 18, linked by a connection 19, this computer itself being linked by connections, 20 and 21 respectively, to the geared motors 11 and 12 for driving the conveyors 9 and 10.

Advantageously, the processing circuit 17 is designed to carry out an analysis of the images received from the camera, notably enabling a convexity test to be carried out on these. It is found, in fact, that the projection onto any plane whatsoever of a convex shape necessarily gives rise to a silhouette which is itself convex. Conversely, a silhouette presenting concave sections will necessarily correspond to an overlapping or superimposition of several packages and can consequently be interpreted as corresponding to a situation of poor separation, giving rise to an act of intervention on the device in order instantly to remove the non-separated packages thus detected and automatically recycle them, thus ensuring their suitable spacing. Other precise details of the processing procedure thus used are given in the patent application filed in parallel with this application, by the same patentees, for a "Device for controlling and regularising the spacing of parcels, packages or similar objects, more particularly of postal parcels".

The functioning of the device is as follows: following a displacement, over the length L and at the speed V2, of the second conveyor belt 10, on which the packages or parcels 7 have previously been distributed in bulk from the first conveyor 9, the camera 14 captures the corresponding image, transmitted to the circuit 17, which simultaneously enables to be calculated, from the silhouette of these packages, the number Nc of those present within this image.

The computer 18 then controls the transfer of these packages, spread over the length L of the second conveyor 10, towards the drum 1, disposed in the extension of the conveyor. At this moment and according to the number of packages Nc detected within the image, the computer 18 commands a variation of the speed V2 of the second conveyor 10, so as to satisfy the formulae (1) and (2) as previously defined, thereby ensuring that the throughput of the packages tipped into the separator drum corresponds precisely to the desired target value D.

The triggering of the acquisition of each image by the camera is ensured by an incremental coder (not represented), provided at the extremity of the second conveyor or alongside this extremity, in advance of the drum 1, and by a control board belonging to the processing circuit 17, which sends a blip each time the second conveyor has travelled a length L, whatever its speed V2 may be.

There is thus obtained a control device for a flow of objects, more particularly of postal parcels or packages, which is of very simple design and which enables the throughput of these packages to be regularised with a view to their efficient separation in the separator drum, in order to obtain a suitable spacing of these packages on the conveyor disposed at the outlet of this drum, a spacing precisely necessary to their satisfactory processing in the following part of the installation.

Of course, it goes without saying that the invention is not confined to the embodiment example specifically described and represented above; on the contrary, it embraces all variations thereof.

What is claimed is:

1. Control device for a flow of objects in continuous file and, more particularly, of postal parcels or packages, prior to their introduction into a separator mechanism which imposes at its oulet a suitable spacing between one object and the next, which comprises a first conveyor belt on which the objects are disposed in bulk, this conveyor travelling at a variable linear speed (VI), a second conveyor belt, disposed following the first and driven at a similarly variable linear speed (Vs), a photographic camera for the acquisition in real time of an image of the second conveyor and of the packages transported by it, presenting according to the length of the conveyor a given longitudinal dimension (L), a processing circuit for the image received from the camera in order to discern within this image the number of packages (Nc) which it contains, a computer for controlling the instantaneous speeds (V1 and V2) of the two conveyors during the transfer of the packages disposed on the second conveyor according to the dimension (L), this speed (V2) being chosen such that the throughput of the packages delivered by the second conveyor to the entrance of the separator mechanism is constantly equal to a predetermined target value (D), and an incremental coder for triggering the acquisitions of images by the camera.

2. Control device according to claim 1, wherein the speeds of the two conveyors are determined such that they satisfy the formulae :

$$V1 = K \cdot V2 \text{ where } K \leq 1$$

$$\text{and } V2 = \frac{L \cdot D}{Nc}$$

3. Control device according to claim 1, wherein said photographic camera is a CCD camera, of the charge-transfer solid-component matrix type, connected to an infra-red filter.

4. Control device according to claim 1, wherein the said camera is also connected to a lighting aggregate.

5. Control device according to claim 3, wherein said two conveyor belts are driven by geared motors incorporating a speed variator.

6. Control device according to claim 1, wherein said processing circuit comprises an electronic assembly suitable for digitalising the image provided by the camera and for extracting from its contour, in real time, an estimate of the number of packages (Nc) which it contains.

7. Device according to claim 1, wherein the incremental coder triggers the acquisition of an image of the second conveyor each time that this has travelled the length (L).

* * * * *